March 10, 1925.  D. C. DAWSON  1,529,347
DISPLAY CARD
Filed Aug. 22, 1923
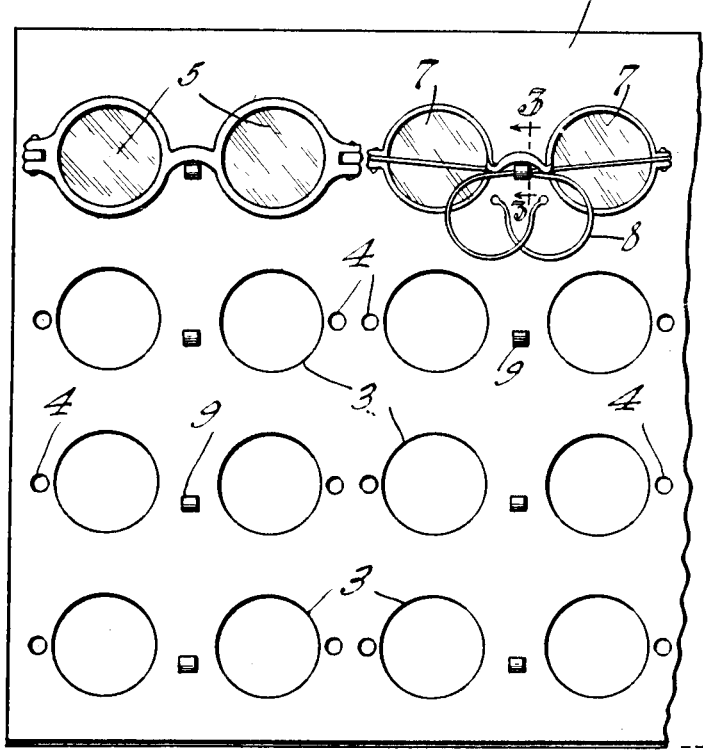
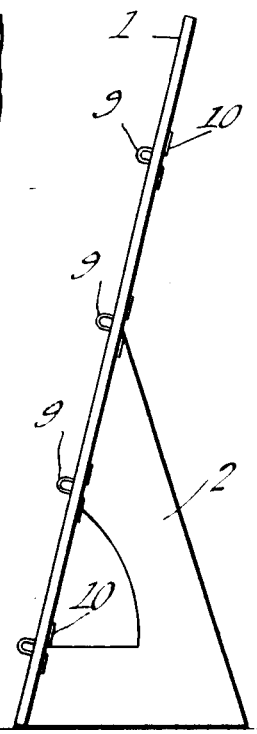
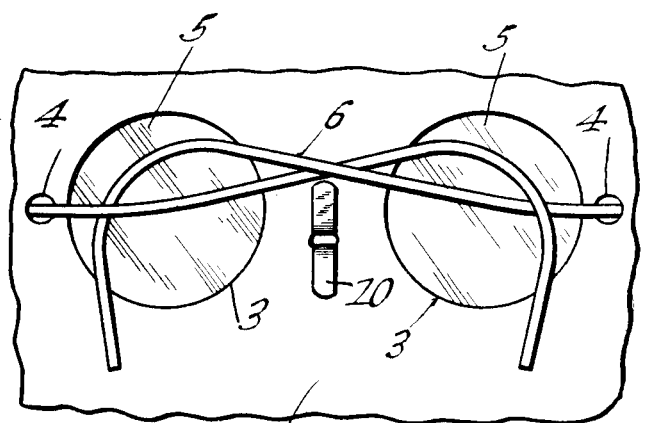
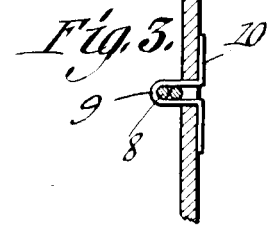
Inventor
D. C. Dawson Patented Mar. 10, 1925.

1,529,347

UNITED STATES PATENT OFFICE.

DON COLLIS DAWSON, OF COLUMBUS, OHIO.

DISPLAY CARD.

Application filed August 22 1923. Serial No. 658,780.

*To all whom it may concern:*

Be it known that I, DON C. DAWSON, a citizen of the United States, residing at Columbus, in the county of Franklin and State of Ohio, have invented a new and useful Display Card, of which the following is a specification.

This invention aims to provide novel means whereby spectacles may be so displayed that persons desiring to purchase may test the spectacles without removing them from the support on which they are mounted, the term "spectacles" being used generally, hereinafter without further explanation, to cover either glasses for reading, and the like, and, as well, that form of eye shield which is known as a pair of goggles.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:

Figure 1 shows in front elevation, a device constructed in accordance with the invention, parts being broken away; Figure 2 is a side elevation; Figure 3 is a section on the line 3—3 of Figure 1; Figure 4 is a fragmental rear elevation.

In carrying out the invention there is provided a support 1, in the form of a card or plate, the support ordinarily being disposed at an angle to the vertical, as shown in Figure 2, and being held in that position by an easel 2 or any other device of a similar sort. The support 1 has main openings 3 which are spaced apart by a distance equal to the distance between the centers of the lenses of the spectacles, it being recalled that the term "spectacles" is to be construed as including goggles. Any suitable means may be provided for holding the spectacles on the support 1. If desired, the support 1 may be equipped with auxiliary openings 4, located outwardly of the main openings 3. The numeral 5 designates the lenses of a pair of spectacles, the lenses being brought into registration with one pair of the main openings 3. The temples 6 of the spectacles may be extended through the auxiliary openings 4, and interengaged with each other, behind the support 1, as shown in Figure 4. If preferred, the temples 8 of a second pair of spectacles, including lenses 7, may be crossed on each other, as shown in Figure 1, a fastener 9 being disposed about the temples 8, at their place of crossing, the fastener being in the form of a bendable staple, extended through the support 1, and having its ends 10 clinched on the back of the support, as shown in Figure 3.

Regardless of the particular means whereby the spectacles are held on the support 1, it will be understood that a person may glance through any pair of spectacles on the support 1 owing to the position of the main openings 3 which are vertical with the lenses. The person, thus can test the spectacles without removing them from the card or support 1 and a great saving of time as well as wear and tear on the spectacles is avoided.

What is claimed is:

In a device of the class described, a support having main openings which are spaced apart by a distance equal to the distance between the lenses of a pair of spectacles, the support having auxiliary openings spaced from the main openings and adapted for the reception of the temples of a pair of spectacles, and so spaced that when the temples are engaged with the auxiliary openings, the lenses of the spectacles will be held in registration with the main openings, the support being thin enough so that the temples may be interengaged, behind the support.

In testimony that I claim the foregoing as my own, I have hereto affixed my signature in the presence of two witnesses.

DON COLLIS DAWSON.

Witnesses:
CHAS. M. MCMASTER.
C. B. SMITH.